US009700073B2

(12) United States Patent
Arakaki et al.

(10) Patent No.: US 9,700,073 B2
(45) Date of Patent: Jul. 11, 2017

(54) POWDERED NUTRITIONAL COMPOSITION WITH LARGE LIPID GLOBULES

(71) Applicant: N.V. Nutricia, Zoetermeer (NL)

(72) Inventors: Cecilia Arakaki, Utrecht (NL); Maarten Pieter Valk, Utrecht (NL); Raoul Charles Johan Moonen, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 0 days.

(21) Appl. No.: 15/035,387

(22) PCT Filed: Nov. 7, 2014

(86) PCT No.: PCT/NL2014/050768
§ 371 (c)(1),
(2) Date: May 9, 2016

(87) PCT Pub. No.: WO2015/069107
PCT Pub. Date: May 14, 2015

(65) Prior Publication Data
US 2016/0295895 A1 Oct. 13, 2016

(30) Foreign Application Priority Data

Nov. 11, 2013 (WO) .................. PCT/EP2013/073513

(51) Int. Cl.
*A23L 1/29* (2006.01)
*A23P 10/43* (2016.01)
(Continued)

(52) U.S. Cl.
CPC .............. *A23P 10/43* (2016.08); *A23L 1/0035* (2013.01); *A23L 1/0038* (2013.01); *A23L 1/09* (2013.01);
(Continued)

(58) Field of Classification Search
CPC . A23L 33/40; A23V 2250/18; A23V 2002/00; A23D 7/00; A23G 22/06; A23G 22/08; A23G 2220/20
(Continued)

(56) References Cited

U.S. PATENT DOCUMENTS 6,391,373 B1 * 5/2002 Kaiser .................. A23G 1/36
426/631
2004/0214791 A1 10/2004 Auestad et al.
2008/0041861 A1 2/2008 Crawford et al.

FOREIGN PATENT DOCUMENTS

EP 2 638 811 A1 9/2013
WO WO-96/33619 A1 10/1996
(Continued)

OTHER PUBLICATIONS

"Micronised pharmaceutical lactose", pp. 5 and 6, taken from www.dfepharma.com/en/excipients/lactose/micronised-lactose.aspx, Oct. 4, 2014 with WayBack Machine page to show dates this article was published.*
(Continued)

*Primary Examiner* — Helen F Heggestad
(74) *Attorney, Agent, or Firm* — Sunit Talapatra; Foley & Lardner LLP

(57) ABSTRACT

The invention pertains to powdered nutritional compositions comprising large lipid globules and micronized carbohydrate or carbohydrate microcrystals. Preferably the nutritional composition is an infant or follow on formula or a growing up milk. The invention also pertains to the use of micronized carbohydrate or carbohydrate microcrystals for improving flow and reducing cohesiveness of a powdered nutritional composition with large lipid globules.

25 Claims, 1 Drawing Sheet

(51) Int. Cl.
- *C13K 5/00* (2006.01)
- *A23P 10/40* (2016.01)
- *A23L 33/00* (2016.01)
- *A23L 33/115* (2016.01)
- *A23L 33/19* (2016.01)
- *A23L 1/00* (2006.01)
- *A23L 1/09* (2006.01)
- *A23L 1/30* (2006.01)
- *A23L 1/305* (2006.01)
- *A23L 29/30* (2016.01)

(52) U.S. Cl.
CPC ............. *A23L 1/296* (2013.01); *A23L 1/3006* (2013.01); *A23L 1/3056* (2013.01); *A23L 33/115* (2016.08); *A23L 33/19* (2016.08); *A23L 33/40* (2016.08); *A23P 10/40* (2016.08); *C13K 5/00* (2013.01); *A23L 29/35* (2016.08); *A23V 2002/00* (2013.01)

(58) Field of Classification Search
USPC ............ 426/2, 580, 590, 601, 648, 658, 801
See application file for complete search history.

(56) References Cited

FOREIGN PATENT DOCUMENTS

| WO | WO-2006/086130 A2 | 8/2006 |
| WO | WO-2010/027258 A1 | 3/2010 |
| WO | WO-2012/173467 A1 | 12/2012 |

OTHER PUBLICATIONS

International Search Report issued in International Patent Application No. PCT/NL2014/050768, mailed Jan. 23, 2015.

* cited by examiner

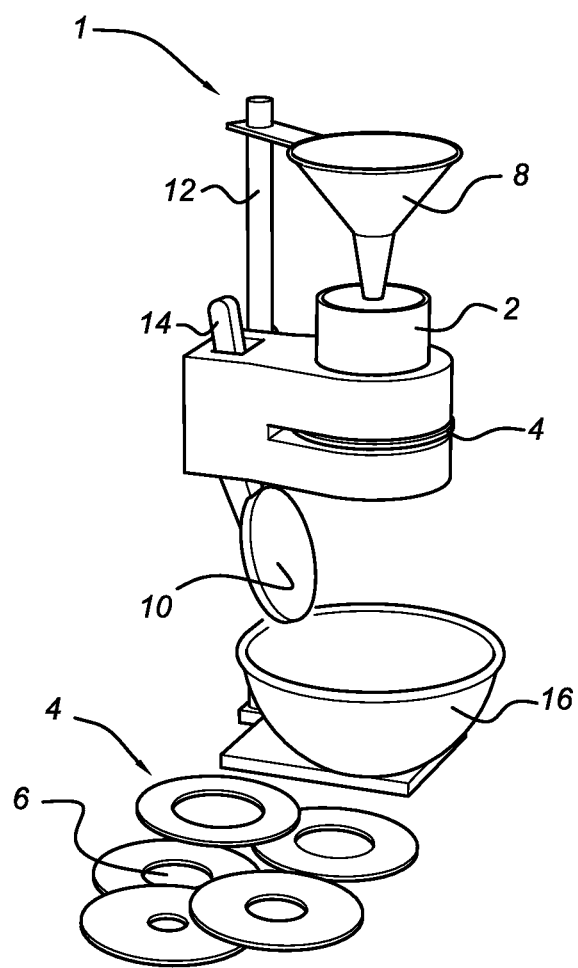

POWDERED NUTRITIONAL COMPOSITION WITH LARGE LIPID GLOBULES

CROSS REFERENCE TO RELATED APPLICATIONS

This application is the National Phase of International Patent Application No. PCT/NL2014/050768, filed Nov. 7, 2014, published on May 14, 2015 as WO 2015/069107 A1, which claims priority to International Patent Application No. PCT/EP2013/073513, filed Nov. 11, 2013. The contents of these applications are herein incorporated by reference in their entirety.

FIELD OF THE INVENTION

The invention relates to powdered nutritional compositions comprising fat, in particular formulas for infants and young children.

BACKGROUND OF THE INVENTION

Today, powdered nutritional compositions such as infant or follow on formula and growing up milks are manufactured by more than a dozen firms in 40-50 processing plants worldwide. Infant formula, follow on formula and growing up milks are preferably produced and sold as powders as this reduces transportation costs and increases the shelf life of the products. These formulations for infants and young children have to comply with regulations which allow for the use of only a limited number of ingredients which should or may be present within narrow ranges. Any changes beyond the regulatory nutrient requirements have to be notified to the regulatory bodies which have the authority to take compliance action if needed.

Hitherto, the main challenges the infant formula manufacturers are to come as close to human milk as possible, when taking into account the composition. Standard formulas have been subjected to high pressure homogenization steps yielding lipid globules with a mode diameter based on volume of less than 0.5 µm. Such formula with small lipid globules are typically preferred as these form a stable emulsion in the liquid form. It was found in WO 2010/027258 that formulas with large lipid globules, such as having a volume-weighted mode diameter of above 1 µm, and which are more similar to the lipid globules in unprocessed human milk, have beneficial health effects. The inventors in WO 2010/027258 provided ways to provide powdered formulas based on these larger lipid globules.

The powders should be easily dissolvable (i.e. reconstitutable) with water to a ready to drink liquid. They should not show a separation of different particles during transport and storage, as this may result in a nutrient imbalance over the time of use. The powder should also be easily flowable in order to facilitate packaging in the factory and enable easy handling and dosing by the end user. Some of these problems are easy dosing by preventing clumping and to ease dissolving of the powder in water which is related to a particle structure and size distribution. This remains to be a challenging task for the manufacturers. Both moisture and fat present in powdered infant formula potentially contribute to caking. According to the instruction manuals provided with the commercial infant formulas, the end user should prepare a milk bottle by measuring the amount of powder using a scoop or spoon, and dispersing the pre-determined amount in water at the desired temperature. In US 2008/0041861 is an example thereof. If the powder does not have good flowability properties and is sticky, the scoops or spoons may become coated with powder.

In the art there is thus a need to avoid or minimize lumping and cohesion particularly when dispensing the formula in water. Not only in the household, but also in the factory the cohesiveness of the powder should be low and the flowability of the powder high in order to facilitate filling the cans and the like. In production, the problems of cohesion and caking of these powders lead to significant costs.

SUMMARY OF THE INVENTION

It is the inventors' contribution to the field of powdered nutritional compositions, particularly fat-containing powdered nutritional compositions, such as infant formulas, follow up formulas or growing up formulas, to improve both handling in the factory and by the consumer of powder formulations with large lipid globules by rendering such formulations having improved flowing properties, and preferably by reducing caking or lumping issues. With their insights consumer handling can be greatly improved and any potential nutrient imbalance issues avoided.

Powdered formulas comprising large lipid globules such as those in WO 2010/027258 disadvantageously show an increased cohesiveness and a reduced flowability when compared with powder of standard formula comprising small lipid globules. As a formula with large lipid globules is desired for health benefits, and the formula with large lipid globules is preferably in powder form for economic and product stability reasons, the increased cohesiveness and decreased flowability creates problems in the factory during manufacturing, and creates problems in the handling by the consumer.

There is thus particularly a need in the art to provide powdered nutritional compositions such as infant formulas having large lipid globules with improved flowability and reduced cohesiveness, all for the aforementioned reasons.

Flowability of powdered formula for infants and young children compositions cannot be amended by incorporating just any free-flowing agent. Care is taken to introduce new components foreign to infant formula nutrients as these are defined by the CODEX STAN 73-1981 *"Standard For Infant Formula and Formulas For Special Medical Purposes Intended for Infants"* and regulatory bodies. For instance, anticaking ingredients such as silica would not be allowed. It is therefore an object of the invention to render the formula powder in a free-flowing format without the need for ingredients not approved by authorities as infant formula nutrients.

To that end, the inventors have found that microcrystalline carbohydrates, such as micronized digestible carbohydrates, e.g. lactose, glucose, starch, maltodextrin and sucrose, and micronized indigestible carbohydrates such as inulin, could advantageously be used as a flowing agent to render the powder sufficiently flowable and decrease cohesiveness. In a preferred embodiment, the flowing agent is a digestible microcrystalline carbohydrate, preferably comprising micronized lactose, micronized glucose, micronized maltodextrin, micronized starch and/or micronized sucrose, and/or an indigestible microcrystalline carbohydrate such as inulin, most preferably at least micronized lactose. Authorities would more readily allow for use of these carbohydrates in powdered nutritional compositions, particularly powdered nutritional compositions intended for young children, e.g. infant formulations, since all of these carbohydrates are, albeit in larger forms, already part of conventional infant formula powder particulate material and growing up milk formulations. Lactose is for instance present in copious amounts of about 40 wt % in infant milk formulations. The micronized carbohydrates are present in particulate form distributed alongside the larger powdered nutritional material comprising lipid globules, thus preventing these larger powdered fat-containing nutritional compositions from cohesion. These effects would not or to a lesser extent be achieved when the micronized carbohydrates would be integrated with the nutritional particulate material during manufacturing, mixing before spraying.

The invention thus pertains to the use of the abovementioned micronized carbohydrates, preferably micronized lactose, glucose, maltodextrin, starch, inulin and/or sucrose, preferably at least micronized lactose for improving flow and reducing cohesiveness and/or reducing caking of a powdered nutritional composition. The invention also pertains to a method for improving flowability and reducing cohesiveness and/or caking of a powdered nutritional composition, said method comprising adding micronized carbohydrate, preferably micronized lactose, glucose, maltodextrin, starch, inulin and/or sucrose, preferably at least micronized lactose to the powder.

Further, the invention pertains to a powdered nutritional composition comprising protein, carbohydrates and:
 a. lipid globules with a volume weighted mode diameter of 1 micrometer or above and/or at least 45 volume % based on total lipid with a diameter of 2 to 12 micrometer; and
 b. micronized carbohydrates, wherein said micronized carbohydrates preferably comprise one or more selected from the group consisting of micronized lactose, micronized glucose, micronized maltodextrin, micronized starch, inulin and micronized sucrose, preferably at least micronized lactose.

The fact that fine carbohydrate particles such as micronized lactose could advantageously be applied to render a powdered formula with large lipid globules with improved flow properties is unattended in the art: EP 1799052 discloses adding crystalline edible lactose together with minerals and vitamins only to a spray-dried, sterile mixture of proteins, lipids and carbohydrates, for controlling the formation of advanced glycation endproducts (AGE) during food processing involving heat steps (such as sterilization). The process using conventional lactose ingredients disclosed in EP 1799052 does not implicitly render any improved flow properties. Nevertheless, its contents is herein incorporated by reference in its entirety.

The present inventors have found it is paramount to use micronized carbohydrates, preferably micronized digestible carbohydrates such as micronized lactose or lactose microcrystals, sufficiently fine or small to render powdered formula with large lipid globules good flow properties which are comparable to standard powdered formulas with standard, i.e. small, lipid globules. Evidence to that end is provided in the experimental section here below.

With no aim to solve the issues addressed above, WO1996/033619 discusses the usefulness of crystallized lactose microparticles as bulking agents, consistency-improving agents or as fat and/or sugar replacement agents. WO1996/033619 is looking for a fat-like mouthfeel. Also, lactose microcrystals are sometimes used in small amounts in the art as seeds for initiating and controlling crystallization in food products where so desired. Hitherto, the prior art is silent on supplementing powdered nutritional compositions with micronized carbohydrates, let alone for controlling the flowing properties and reducing caking of such powders.

LIST OF EMBODIMENTS

The invention is expressed in terms of its preferred embodiments:
1) A powdered nutritional composition comprising protein, carbohydrates and
 a) lipid globules with a volume weighted mode diameter of 1 micrometer or above and/or at least 45 volume% based on total lipid with a diameter of 2 to 12 micrometer; and
 b) micronized carbohydrates (i) being smaller than 30 micrometer, and/or (ii) of which at least 80 volume % has a size less than 20 micrometer, and/or (iii) of which at least 80 volume % has a size less than 10 micrometer, and/or (iv) having a volume median particle size D50 below 10 micrometer, wherein said micronized carbohydrates preferably comprise one or more selected from the group consisting of micronized lactose, micronized glucose, micronized maltodextrin, micronized starch, micronized inulin and micronized sucrose;
2. The powdered nutritional composition according to embodiment 1, wherein said micronized carbohydrates are characterized by at least (iii) and/or (iv), preferably at least (iii);
3. The powdered nutritional composition according to embodiment 1 or 2, wherein said micronized carbohydrates are present in an amount of 1-30 wt %, preferably between 1 and 20 wt %, more preferably between 2 and 20 wt %, most preferably between 2 and 15 wt %, even more preferably between 2 and 10 wt %, based on total weight of the composition;
4. The powdered nutritional composition according to any one of the preceding embodiments, having a Flodex flowability index of at least 30, preferably at least 35, preferably at least 40, more preferably at least 45;
5. The powdered nutritional composition according to any one of the preceding embodiments, wherein the micronized carbohydrates comprise at least or consist of micronized lactose;
6. The powdered nutritional composition according to any one of the preceding embodiments, being an infant formula, a follow on formula, and/or a growing up formula;
7. The powdered nutritional composition according to any one of the preceding embodiments, wherein the composition comprises 30-60 en % lipid, preferably 35-55 en % lipid, based on total energy content; and/or 10 to 50 wt % lipid based on the weight of the nutritional composition;
8. The powdered nutritional composition according to any one of the preceding embodiments, comprising at least 0.5 wt % phospholipids based on total lipid;
9. The powdered nutritional composition according to any one of the preceding embodiments, comprising protein derived from bovine milk;
10. The powdered nutritional composition according to any one of the preceding embodiments, having a moisture content of 2-3 wt %, based on total composition;
11. The powdered nutritional composition according to any one of the preceding embodiments, wherein the lipid globules have a volume-weighted mode diameter between 2.0 and 10 micrometer, more preferably between 2.0 and 8.0 micrometer, even more preferably between 3.0 and 8.0 micrometer, most preferably between 4.0 micrometer and 8.0 micrometer;

12. The powdered nutritional composition according to any one of the preceding embodiments, wherein at least 45 volume %, preferably at least 55 volume %, even more preferably at least 65 volume %, even more preferably at least 75 volume % of said lipid globules has a diameter between 2 and 12 micrometer;
13. The powdered nutritional composition according to any one of the preceding embodiments, being packaged;
14. A method for manufacturing a powdered nutritional composition, comprising (a) providing a spray-dried powder comprising proteins, lipids and carbohydrates, vitamins and micronutrients, wherein the lipid globules have a volume weighted mode diameter of 1 micrometer or above and/or at least 45 volume % based on total lipid have a diameter of 2 to 12 micrometer,
    (b) blending said powder with micronized carbohydrates (i) smaller than 30 micrometer, and/or (ii) at least 80 volume % of which has a size less than 20 micrometer, and/or (iii) at least 80 volume % of which has a size less than 10 micrometer, and/or (iv) having a volume median particle size D50 below 10 micrometer, wherein said micronized carbohydrates preferably comprise one or more selected from the group consisting of micronized lactose, micronized glucose, micronized maltodextrin, micronized starch, micronized inulin and micronized sucrose, wherein the micronized carbohydrates preferably comprise at least or consist of micronized lactose;
15. The method according to embodiment 14, wherein said micronized carbohydrates are characterized by at least (iii) and/or (iv), preferably at least (iii);
16. A powdered nutritional composition obtainable by the method according to embodiment 14 or 15, said nutritional composition preferably being an infant formula, a follow on formula, and/or a growing up formula;
17. Use of the powdered nutritional composition according to any one of embodiments 1-13 or 16 for providing nutrition to a human subject in need thereof, preferably to a young child between 0 and 6 years of age, preferably between 0 and 3 years of age, more preferably an infant of 0 to 12 months of age;
18. A method for providing nutrition to a subject in need thereof, said method comprising providing or feeding said subject with the powdered nutritional composition according to any one of embodiments 1-13 or 16 reconstituted in water;
19. Use of micronized carbohydrates for improving flow and/or reducing the cohesiveness and/or caking of a powdered nutritional composition comprising lipid globules with a volume weighted mode diameter of 1 micrometer or above and/or at least 45 volume % based on total lipid with a diameter of 2 to 12 micrometer, wherein the micronized carbohydrates (i) are smaller than 30 micrometer, and/or (ii) at least 80 volume % of which has a size less than 20 micrometer, and/or (iii) at least 80 volume % of which has a size less than 10 micrometer, and/or (iv) have a median particle size D50 below 10 micrometer, wherein said micronized carbohydrates preferably comprise one or more selected from the group consisting of micronized lactose, micronized glucose, micronized maltodextrin, micronized starch, micronized inulin and micronized sucrose, wherein the micronized carbohydrates preferably comprise at least or consist of micronized lactose;
20. Use according to embodiment 19, wherein said micronized carbohydrates are present in an amount of 0.5-30 wt %, preferably 2.0-10 wt %, more preferably 3.0-8 wt %, based on total weight of the composition.

BRIEF DESCRIPTION OF THE FIGURE

The FIGURE shows the Flodex apparatus 1, which consists of a cylinder 2 with interchangeable disks 4 with holes of various diameters located at the bottom of the cylinder 2.

DETAILED DESCRIPTION OF THE INVENTION

Micronized Carbohydrate or Carbohydrate Microcrystals

In a preferred embodiment, the terms 'carbohydrate microcrystals', 'microtine carbohydrate crystals, 'micronized carbohydrate' and 'microcrystalline carbohydrate' in the context of the present invention are all used interchangeably, and preferably refer to carbohydrate particles: (i) smaller than 30 micrometer (μm), preferably smaller than 25 micrometer, and/or (ii) of which at least 80% has a size less than 20 micrometer, preferably at least 90% has a size less than 20 micrometer, and/or (iii) of which at least 80% has a size less than 10 micrometer, more preferably at least 90% has a size less than 10 micrometer, and/or (iv) having a median particle size D50 below 10 micrometer, preferably below 8 micrometer, more preferably below 7 micrometer, most preferably below 6 micrometer. The above percentages are in terms of volume %. The carbohydrate particles are preferably characterized by (iii) and/or (iv), preferably at least (iii) here above.

The microparticles may be distinguished from the nutritional particulate materials by size, the latter on average being much larger and exhibiting larger size distributions. In one embodiment, the carbohydrate microcrystals according to the invention have an average particle size or median volume diameter ranging between 0.1 and 20 micrometer, more preferably between 0.5 and 15 micrometer, more preferably between 1 and 10 micrometer, most preferably between 2 and 10 micrometer. In one embodiment, the microcrystalline carbohydrates substantially consist of carbohydrates, i.e. said microcrystalline carbohydrate particles preferably comprise at least 90%, more preferably at least 95%, most preferably consist of said carbohydrates based on total weight of these particles.

The micronized carbohydrates are preferably based on carbohydrates conventionally applied in the powdered nutritional compositions, preferably carbohydrates conventionally applied in infant formulas, more preferably these micronized carbohydrates are micronized digestible carbohydrates, most preferably one or more selected from the group consisting of lactose, glucose, sucrose, maltodextrin and starch, and/or micronized indigestible carbohydrates, preferably inulin, especially said micronized carbohydrates comprise or is micronized lactose.

The inventors found that good results are obtained when the micronized carbohydrate content in the powder composition ranges between 1 and 30 wt %, preferably between 1 and 20 wt %, more preferably between 1 and 20 wt %, more preferably between 2 and 20 wt %, most preferably between 2 and 15 wt %, even more preferably between 2 and 10 wt %, most preferably between 2 and 9 wt %, more particularly between 2 and 8 wt %, even more preferably between 2 and 6 wt %, based on total weight of the composition. In one embodiment, the micronized carbohydrate content ranges between 3 and 20 wt %, most preferably between 3 and 10 wt %, most preferably between 3 and 8 wt %, particularly 3-6 wt %, based on total weight of the composition. Weight % optimization is tested in Table 1. Despite that no use is made of any nutrients foreign to the powdered nutritional composition, preferably no nutrients or compounds foreign to infant formula, it is still preferred to maintain low levels of carbohydrate microparticles. It is the inventors' belief that the optimum flow properties may be the interplay between the microcrystalline carbohydrate particle size and the relative amount of particles present in the composition; with the information provided by the inventors, it is considered within the ambit of the skilled person's knowledge to find the optimum amount and size distribution of micronized carbohydrate particles in order to achieve the desired flow.

In one embodiment, the carbohydrate microcrystals comprise or are alpha-lactose monohydrate particles which are milled or sieved to the desired particle size distribution. Good results are obtained with Lactochem®microfine, commercially available from DFE Pharma.

Large Lipid Globules

Many infant formulae or growing up milks have lipid globules with mode diameter below 0.5 micrometer. The lipid globules typically exhibit a volume-weighted mode diameter of about 0.3-0.6 micrometer. Less than 55 volume % based on total lipid, typically less than 35 volume %, has a size between 2 and 12 micrometer. The lipid globules are for a large part covered with milk proteins, in particular casein.

The lipid in the powdered nutritional composition according to the invention is present in the form of large lipid globules, since the effects of reduced flowability are particularly pronounced there. Reference is made to the experimental section, particularly Table 1 therein. In one embodiment the large lipid globules of the present invention preferably have a volume-weighted mode diameter above 1.0 micrometer, preferably above 3.0 micrometer, more preferably 4.0 micrometer or above. In one embodiment, the large lipid globules preferably have a volume-weighted mode diameter between 1.0 and 10 micrometer, more preferably between 2.0 and 8.0 micrometer, even more preferably between 3.0 and 8.0 micrometer, most preferably between 4.0 micrometer and 8.0 micrometer.

Additionally, the size distribution of the large lipid globules is preferably in such a way that at least 45 volume %, preferably at least 55 volume %, even more preferably at least 65 volume %, even more preferably at least 75 volume % has a diameter between 2 and 12 micrometer. More preferably at least 45 volume %, preferably at least 55 volume %, even more preferably at least 65 volume %, even more preferably at least 75 volume % has a diameter between 2 and 10 micrometer. Even more preferably at least 45 volume %, preferably at least 55 volume %, even more preferably at least 65 volume %, even more preferably at least 75 volume % has a diameter between 4 and 10 micrometer. Preferably less than 5 volume % has a diameter above 12 micrometer.

Here above, the percentage of lipid globules is based on volume of total lipid. The mode diameter relates to the diameter which is the most present based on volume of total lipid, or the peak value in a graphic representation, having on the X-as the diameter and on the Y-as the volume (%) or volume frequency (%). The volume of the lipid globule and its size distribution can suitably be determined using a particle size analyzer such as a Mastersizer (Malvern Instruments, Malvern, UK), for example by the method described in Michalski et al, 2001, Lait 81: 787-796. Without wishing to be bound by theory, a powdered composition with large lipid globules has a higher free fat content on the surface of the globules, than the powdered composition with small lipid globules. This may contribute to the decreased flowability of the formula for which the inventors have provided a solution.

The core of the large lipid globules preferably comprises vegetable fat and preferably comprises at least 90 wt % triglycerides and more preferably essentially consists of triglycerides. Not all vegetable lipids that are present in the composition need necessarily be comprised in the core of lipid globules, but preferably a major part is, preferably more than 50% wt %, more preferably more than 70 wt %, even more preferably more than 85 wt %, even more preferably more than 95 wt %, most preferably more than 98 wt % of the vegetable lipids that are present in the composition are comprised in the core of lipid globules. In one embodiment the core of the lipid globules comprises at least 30 wt % triglycerides of vegetable origin, more preferably the core of the lipid globules comprises at least 85 wt %, more preferably at least 95 wt % triglycerides of vegetable origin.

Preferably the vegetable fat component comprises at least 90 wt % triglycerides. Preferably the composition comprises 30 to 90 wt % vegetable lipids based on total lipids, more preferably 40 to 85 wt %, more preferably 40-75 wt %, most preferably 40-60 wt %, based on total lipids.

Preferably the fat comprises lipids from mammalian milk, preferably ruminants milk, preferably cow's milk, goat milk, sheep milk, buffalo milk, yak milk, reindeer milk, and camel milk, most preferably cow's milk. Preferably the mammalian milk component comprises at least 70 wt % triglycerides, more preferably at least 90 wt %, more preferably at least 97 wt %. Preferably the mammalian milk lipid is derived from the group consisting of butter, butter fat, butter oil, and anhydrous milk fat, more preferably anhydrous milk fat and butter oil. Such milk fat lipid sources are high in triglyceride levels. Furthermore these lipid sources are in the form of a continuous fat phase or a water-in-oil emulsion form. Using these sources of milk fat during the manufacture of the nutritional composition of the present invention enable the formation of lipid globules, wherein each globule comprising a mixture of vegetable fat and milk fat. When milk fat sources are used which are an oil-in-water emulsion, lipid globules being either composed of milk fat or composed of vegetable fat will be generated, which are believed to be less effective.

Preferably the composition comprises 10 to 70 wt % milk lipids based on total lipids, more preferably 15 to 60 w. %, even more preferably 25 to 60 wt %, particularly 40-60 wt %, based on total lipids. Preferably these milk lipids are selected from the group consisting of butter, butter fat, butter oil, and anhydrous milk fat. Preferably the ratio of vegetable fat to milk fat ranges from 3/7 to 9/1, more preferably it ranges from 2/3 to 3/2.

The present composition preferably comprises at least one lipid selected from the group consisting of animal lipid (excluding human lipids) and vegetable lipids. Preferably the present composition comprises a combination of vegetable lipids and at least one oil selected from the group consisting of fish oil, animal oil, algae oil, fungal oil, and bacterial oil. Preferably the present composition comprises at least 0.50 wt %, preferably at least 0.60 wt %, more preferably at least 0.70 wt % LC-PUFAs with 20 and 22 carbon atoms of the total fat content It is preferred that at least 80 wt %, more preferably at least 85 wt %, most preferably 85-100 wt % of the LC-PUFAs with 20 and 22 carbon atoms is provided by the combination of EPA and DHA.

The lipid provides preferably 30 to 60% of the total calories of the composition. Morepreferably the present composition comprises lipid providing 35 to 55% of the total calories, even more preferably the present composition comprises lipid providing 40 to 50% of the total calories. When in liquid form, e.g. as a ready-to-feed liquid, the composition preferably comprises 2.1 to 6.5 g lipid per 100 ml, more preferably 3.0 to 4.0 g per 100 ml. The present composition preferably comprises 10 to 50 wt % lipid, more preferably 12.5 to 40 wt % lipid, even more preferably 19 to 30 wt % lipid, based on total weight of the powdered nutritional composition. The lipid comprises preferably from 80 to 100 wt % triglycerides based on total lipid, more preferably 90 to 100 wt %.

The present powdered nutritional composition comprises lipid globules with a lipid volume-weighted mode diameter of above 1.0 μm, preferably between 1.0 and 10 micrometer, or any of the aforementioned narrower ranges; and/or with at least 45 volume %, more preferably at least 55 volume % with a diameter of 2 to 12 micrometer based on total lipid. This can be achieved upon homogenizing of the lipid component at lower pressures, preferably in the presence of polar lipids. More detail is provided in WO 2010/027258 and WO 2012/173486, their contents hereby incorporated by reference.

In one embodiment, the composition preferably comprises phospholipids (the sum of glycerophospholipids and sphingomyelin). Phospholipids are preferably present as a coating on the surface of the lipid globule. By 'coating' is meant that the outer surface layer of the lipid globule comprises polar lipids, whereas these phospholipids are virtually absent in the core of the lipid globule. While the micronized carbohydrates according to the invention improve flowability and reduce stickiness of powdered nutritional compositions comprising large lipids with and without any added phospholipids, in one embodiment the coating preferably comprises phospholipids. Not all phospholipids that are present in the composition need necessarily be comprised in the coating, but preferably a major part is. Preferably more than 50 wt %, more preferably more than 70 wt %, even more preferably more than 85 wt %, most preferably more than 95 wt % of the phospholipids that are present in the composition are comprised in the coating of lipid globules. In one embodiment, in the nutritional composition according to the invention the lipid globules have a volume mode diameter as defined before, and the composition comprises 0.5 to 20 wt % phospholipids based on total lipid; preferably at least part of the phospholipids is present in the coating on the surface. More detail is provided in WO 2010/027258, WO 2012/173486, and WO 2013/135738; their contents herewith incorporated by reference.

Powdered Nutritional Composition

The composition is a powdered nutritional composition comprising a fat fraction, preferably comprising fat, protein and carbohydrates. It is preferably a milk-based powdered nutritional composition. In one embodiment, the powdered nutritional composition is an infant formula. In the context of the invention, the term 'infant formula' includes follow up formula which is provided in powdered form and administered to the infant in reconstituted form using an effective amount of nutritionally or pharmaceutically acceptable liquid. The infant formula is preferably an infant milk formula, including follow up milk formula. As detailed here above, 'infant formula' is well-defined and controlled internationally and consistently by regulatory bodies. In particular, the CODEX mentioned above is widely accepted. This recommends for nutritional value and formula composition, which require the prepared milk to contain per 100 ml not less than 60 kcal (250 kJ) and no more than 70 kcal (295 kJ) of energy. FDA and other regulatory bodies have set nutrient requirements in accordance therewith. In one embodiment, the infant formula is defined according to FDA 21 CFR 107.100. The content is herein incorporated by reference. The terminology 'infant formula powder' and 'powdered infant formula' are used interchangeably.

In one embodiment, the powdered nutritional composition is a growing up milk, also referred to as toddler milk, or a milk based drink for young children, which is provided in powdered form and administered to the young child in reconstituted form using an effective amount of nutritionally or pharmaceutically acceptable liquid.

Infant formula or growing up formula according to the present invention preferably contains 35-55 energy % (preferably 35-50 en %) fat, more preferably 5 to 12.5 energy % (preferably 7.5-12.5 en %) protein; 40 to 55 energy % carbohydrates; and 35 to 50 energy % fat. The term energy %, also abbreviated as en%, represents the relative amount each constituent contributes to the total caloric value of the formula. With the universally applied conversion factors these energy contributions could be recalculated in terms of relative weight amounts.

The present powdered nutritional composition preferably comprise protein selected from the group consisting of non-human animal proteins (such as milk proteins, meat proteins and egg proteins), vegetable proteins (such as soy protein, wheat protein, rice protein, and pea protein) and amino acids and mixtures thereof. Preferably the powdered nutritional composition comprise cow milk derived nitrogen source, particularly cow milk proteins such as casein and whey proteins. In one embodiment the powdered nutritional composition comprises hydrolyzed milk protein, for example hydrolyzed casein and/or hydrolyzed whey protein. The preferred powdered nutritional composition in the context of the invention is dairy-based, i.e. 'powdered nutritional milk-based composition', such as 'infant milk formula' or 'milk based drinks for young children'.

Because lactose is often an important digestible carbohydrate source, particularly for infants, the present powdered nutritional composition preferably comprises at least 35 wt % lactose based on weight of total digestible carbohydrate, more preferably at least 50 wt %, most preferably at least 75 wt %. In one embodiment, the sum of all lactose including any micronized lactose in the powdered nutritional composition amounts to 30-50 wt %, preferably 35-45% of the composition. Preferably, upon reconstitution, the composition comprises at least 3 g lactose100 ml, more preferably at least 4 g/100 ml, even more preferably at least 5 g per 100 ml. The amounts of any micronized lactose are herein incorporated. The present composition preferably comprises 4 g to 18 g, more preferably 5 to 14 g digestible carbohydrates per 100 ml composition, including micronized digestible carbohydrates.

The composition preferably comprises between 1.5 and 2.5 gram indigestible oligosaccharides per 100 kcal, preferably comprising: i) 1.4-2 gram galactooligosaccharides with a degree of polymerization of 2-7; and ii) 0.1-0.5 gram fructopolysaccharides with degree of polymerization of 2-150 (including short-chain fructooligosaccharides). The term "fructopolysaccharides" comprises fructans and inulin, and hydrolyzates thereof. The preferred galactooligosaccharides are transgalactooligosaccharides. It is preferred that at least 95 wt %, preferably 95-100 wt % of the indigestible oligosaccharides is provided by galactooligosaccharides and fructopolysaccharides.

The powdered nutritional composition preferably has a caloric density between 0.1 and 2.5 kcal/ml, even more preferably a caloric density of between 0.5 and 1.5 kcal/ml, most preferably between 0.6 and 0.8 kcal/ml. The powdered nutritional composition of the present invention preferably has an osmolality between 50 and 500 mOsm/kg, more preferably between 100 and 400 mOsm/kg.

When in liquid form, the reconstituted nutritional composition preferably has a viscosity between 1 and 100 mPa·s, preferably between 1 and 60 mPa·s, more preferably between 1 and 20 mPa·s, most preferably between 1 and 10 mPa·s. The viscosity of the liquid can be suitably determined using a Physica Rheometer MCR 300 (Physica Messtechnik GmbH, Ostfilden, Germany) at shear rate of 95 $s^{-1}$ at 20° C. This viscosity closely resembles the viscosity of human milk. Furthermore, a low viscosity results in a normal gastric emptying and a better energy intake, which is particularly advantageous for infants who need the energy for optimal growth and development.

In one aspect, the invention pertains to a method for manufacturing a powdered nutritional composition as defined above, said method comprising (i) providing a spray-dried powder comprising proteins, lipids and carbohydrates, vitamins and micronutrients, and (ii) blending said powder with carbohydrate microcrystals smaller than 30 micrometer. Step (ii) is preferably a dry-mixing step. In one embodiment, the invention pertains to a powdered nutritional composition obtainable by the above process. In a preferred embodiment, the powdered nutritional composition is an infant formula or milk based drinks for young children as defined here above.

Flowability and Cohesiveness

The powdered nutritional composition according to the invention may be characterized in terms of its improved flowing properties. The improvement provided by the flowing agent of the invention may be characterized as 'easy flowing' or 'controlled flow'.

Various manners of determining and defining flowability are available in the art., For instance as measured using a TA. HD Plus Powder Flow Analyzer (Stable Micro Systems, Surrey, UK).

The powdered nutritional composition according to the invention exhibits flow behavior which may readily be tested by the skilled person using routine experimentation available in the laboratory, for instance by flowability index measurement. Such a test according to the Flodex™ protocol (Pharma Alliance Group) is described in the Example below. This test is especially marketed for determining the Flodex flowability index measurements. The powdered nutritional composition according to the present invention preferably flows freely by gravity through a circular opening having a width of 32 mm or less, preferably 30 mm or less, more preferably 28 mm or less, most preferably 26 mm or less, particularly 24 or less. Worded differently, in the context of the invention, 'free-flowing', 'easy flowing' or 'flowing' preferably means that the powdered nutritional composition in the above test continuously or interruptedly flows through the above-defined openings ['continuous flow' meaning that the powdered formula poured through the opening is uninterrupted to the eye].

In a preferred embodiment, the flowing properties of the powdered nutritional composition are still regarded acceptable for the purpose of the invention when showing flow through a circular opening having a width in the range of 4-32 mm, particularly 5-30 mm, more preferably 6-28 mm, more preferably 7-26 mm, particularly 8-24 mm. For reference sake, commercially available infant formulae with smaller lipid globules (lacking any free-flowing agents) are found to flow through an opening with a diameter of 24 mm only, at smaller-sized openings blocking occurs. More than other flow parameters existing in the art, this test is regarded indicative of the situation experienced by the end user when preparing a ready-to-drink infant formula from a powder. Flowability index measurements (in terms of the minimum opening or 'ring size' through which flow was observed) are presented as a function of the amount of microcrystalline lactose in Table 1. The results are in accordance with the above preferences.

Associated therewith, the powder of the invention may be characteized in terms of its Flodex™ flowability (index) according to the Flodex™ protocol (Pharma Alliance Group) as defined in the Example below, and which Flodex™ flowability index is defined as 1000 divided by the diameter in millimeters of the smallest hole through which the sample will pass three consecutive (Flodex) tests. The powdered nutritional composition including the micronized carbohydrates preferably exhibits a Flodex flowability index of at least 30, preferably at least 35, preferably at least 40, more preferably at least 45, more preferably at least 55, even more preferably at least 55. For most practical purposes, Flodex flowability indexes greater than 500 would not be required since an opening of 2 mm diameter would unlikely allow sufficient flow for normal dosing purposes. In one embodiment, the Flodex flowability index is 35-250, more preferably 40-250, most preferably 45-250. In one embodiment, the Flodex flowability index ranges between 40 and 100, more preferably between 40 and 80. For reference sake, the Flodex flowability index of commercial infant formulae with smaller lipid globules is about 40. It is noted that the Flodex flowability index is a respected tool to characterize flowability for instance demonstrated outside the field in U.S. Pat. No. 5,236,920, its entire contents and particularly the part 'FLODEX METHOD FOR FLOWABILITY DETERMINATION" herein incorporated by reference. In the context of the invention, cohesiveness or stickiness and/or caking in this example are defined as the inability for a powder to flow freely, for instance as expressed in the above Flodex flowability index, due to various product and process parameters. (e.g. humidity, moisture content, temperature, composition, free fat content, powder morphology, particle size distribution, etc).

In one embodiment, the powder may be characterized in terms of its bulk density. "Bulk density" used herein is typically determined by measuring the volume that a given weight of the powder occupies when poured through a funnel into a stationary graduated cylinder. The powder preferably has a tapped bulk density of between 100 and 900 g/L, preferably between 150 and 800 g/L, more preferably between 300 and 700 g/L, particularly less than 700 g/L,. For the poured bulk density the above limits are preferably 50 g/l lower and can be straightforwardly calculated from the above ranges and numbers.

The powdered nutritional composition preferably has a density of 0.45-0.52 g/ml. In one embodiment, the powdered nutritional composition has a moisture content of 2-3 wt %, based on total composition. These water levels are preferred to safeguard fat stability and minimize fat oxidation during shelf life.

In one embodiment, the powdered nutritional composition average particle size-excluding the above-defined micropar-ticles-ranges between 100 and 1000 micrometer, preferably 200-800 micrometer; the average particle size is more preferably less than 70 micrometer.

Application

The present composition is preferably enterally administered, more preferably orally, upon reconstitution with water. The present composition does not consist of human milk. The present composition can be advantageously applied as a complete nutrition for young children between 0 and 6 years, preferably between 0 and 3 years, more preferably an infant of 0 to 12 months. The present composition therefore preferably comprises a lipid component, protein component and carbohydrate component. The present powdered nutritional composition is preferably provided as a packaged powder, and it may be accompanied with instructions as to mix said dry food mixture with a suitable nutritionally or pharmaceutically acceptable liquid (e.g. water).

In one aspect, the invention pertains to the use of the improved powdered nutritional composition for providing nutrition to a subject, preferably a human subject, more preferably a human infant. Infant formulae and growing up milks are particularly intended for providing nutrition to young children with an age between 0 and 6 years, more preferably between 0 and 3 years, and more preferably infants under 1 year of age. The infant is preferably a human infant. The invention thus pertains to the use of one or more of the above-mentioned micronized carbohydrates in the manufacture of a powdered nutritional composition, for providing nutrition to a subject, preferably a human subject, more preferably a human infant. The invention also relates to a method for providing nutrition to a subject in need thereof, preferably a human subject in need thereof, more preferably a human infant in need thereof, comprising feeding or providing said subject with a powdered nutritional composition reconstituted in water, in accordance with the reconstitution instructions preferably provided in the instruction manual accompanying the powdered nutritional composition, said powdered nutritional composition comprising one or more of the above-mentioned micronized carbohydrates. As explained here above, the powdered nutritional composition preferably comprises large lipid globules. In the context of the present invention, the method for providing nutrition is considered a non-therapeutic method, there are no direct health effects attached. The advantage rests in improved consumer handling. In one embodiment, the method comprises feeding the infant in need thereof standard reconstituted infant formula comprising large lipid globules, said formula supplemented with only one or more of the above-mentioned micronized carbohydrates.

EXAMPLES

Example 1

Infant Milk Formula Powder Composition

Infant formula with an increased size of lipid globules was prepared in accordance with the method as described in example 1 of WO 2013/135738, said formula being a powder comprising per kg final product about 4800 kcal, about 247 g lipid, about 540 g digestible carbohydrates, about 41 g non-digestible oligosaccharides and about 97 g protein. The composition was prepared using butter milk serum powder enriched in milk phospholipids, a vegetable oil blend (fat), demineralised whey powder (protein), lactose, and non-digestible oligosaccharides. Also vitamins, minerals, trace elements as known in the art were used. The amount of butter milk serum powder was such that 1.62 wt. % phospholipids based on total lipids were present in the final composition.

The size of the lipid globules in the final powder, after reconstitution with water, was measured with a Mastersizer 2000 (Malvern Instruments, Malvern UK). The volume weighted mode diameter was 4.3 micrometer. About 60% of the lipid globules based on lipid volume had a diameter between 2 and 12 micrometer. Associated with the large lipid globules, the free fat on the surface of the final powder was about 4.6 wt %, based on total weight of fat. The content of free fat on the surface of milk powder particles was determined according to methods known in the art, i.e. the content of free fat on the surface of milk powder particles was defined as the evaporation residue remaining after the sample had been gently mixed with petroleum ether, filtered and dried.

The powder was blended with x wt % of Lactochem®microfine from DFE Pharma, x being 0, 0.5, 1, 2, 3, 4 and 5, respectively, x being calculated on the total weight of the blended powder composition. As a control commercially available infant formula powder composition (Nutrilon Standard 2™ [Nutricia]) was blended with corresponding amounts of Lactochem®microfine. The volume weighted mode diameter of the infant formula powder was about 0.5 micrometer, and less than 30% of the lipid globules had a diameter in the range of 2-12 micrometer. The free fat on the surface of the final powder was about 0.5-0.7 wt %, based on total weight of fat.

The infant formula powder specifications are in line with those ranges regarded accepted by the regulatory bodies and as defined herein above.

Flowability Index Measurements

The Flodex apparatus 1 as shown in the figure, consists of a cylinder 2 with interchangeable disks 4 with holes 6 of various diameters located at the bottom of the cylinder 2. The determination of flowability is based upon the ability of the powder to fall freely through the hole 6 in the disk 4. The smaller the hole through which the powder falls freely, the better is the flowability. A funnel 8 is provided with its outlet at within 2 cm above the cylinder 2. The hole 6 in the disk 4 at the base of the cylinder is initially kept closed by a closure plate 10, which is hinged downwardly from a retort stand 12 from which the funnel 8 and cylinder 2 are also supported. The closure plate 10 can be released by action of a release lever 14. A receptacle 16 is located below the cylinder 2. Disks with holes of: 4; 5; 6; 7; 8; 9; 10; 12; 14; 16; 18; 20; 22; 24; 26; 28; 30; 32 and 34 mm are provided.

Test Protocol

With the closure plate 10 in the closed position, around 160 mL of material as prepared above is loaded carefully into the cylinder 2 through the funnel, to fill it to within approximately 1 cm of the top. The material is allowed to settle for 60 seconds without tapping or otherwise disturbing the apparatus. The release lever 14 is actuated causing the closure plate 10 to pivot away from the disk 4. The test is deemed positive if the material flows out of the cylinder 2 such that an opening is visible through the disk. The test is carried out successively with smaller disks until flow hampers. From the smallest ring showing acceptable flow, the Flodex flowability can be calculated, which is defined as 1000 divided by the diameter in millimeters of the smallest hole through which the sample will pass three consecutive tests.

Results

The flowability results in terms of minimum disk opening still showing flow of infant formula compositions are shown in table 1, using the relative amount of micronized lactose derived as Lactochem®microfine from DFE Pharma as a parameter.

TABLE 1

Flowability as function of lipid globule size and micronized lactose

| | control | | nutritional powder including large lipid globules | |
|---|---|---|---|---|
| micronized lactose % | Disc opening mm | Flodex | Disc opening mm | Flodex |
| 0 | 24 | 41.7 | >34 | <29 |
| 0.5 | nd* | — | >34 | <29 |
| 1 | nd | — | >34 | <29 |
| 1.3 | 12 | 83.3 | nd | — |
| 2 | 12 | 83.3 | 32 | 31.3 |
| 3 | 8 | 125 | 18 | 55.6 |
| 4 | 9 | 111 | 18 | 55.6 |
| 5 | 9 | 111 | 14 | 71.4 |

*nd not determined

It can be observed that the powdered nutritional composition with large lipid globules has a low Flodex flowability index (lower than 29) and is very sticky when compared with standard infant formula (having a flodex index of about 42). The presence of micronized carbohydrate increased the Flodex flowability index to levels comparable of standard powdered infant formula. Increased flowability is indicative for a decreased cohesiveness.

Example 2

Infant Formula

A package containing a powdered infant formula with instructions to reconstitute 13.6 g powder in water to a ready to drink liquid of 100 ml. The powdered infant formula comprises per 100 g powder 484 kcal, 9.7 g protein (cow's milk derived protein, with whey protein and casein in a weight ratio of 6:4), 53.9 g digestible carbohydrates, 24.7 g lipid, 54.3 g non-digestible oligosaccharides (transgalacto-oligosaccharides and long chain fructo-oligosaccharide). The digestible carbohydrates comprise 51.5 g lactose. Of the total amount of lactose, 2.5 g is provided as micronized lactose, and 49 g is regular lactose part of the nutritional powder). The micronized lactose is the sole source of micronized carbohydrates. Minerals, trace elements, vitamins, carnitine, choline, myo-inositol, and taurine as known in the art.

The lipid consisted of a mix of anhydrous milk fat, coconut oil, low erucic acid rape seed oil, sunflower oil, high oleic acid sunflower oil, and a small amount of soy lecithin, LC-PUFA premix and milk derived phospholipids (source: buttermilk powder). The amount of vegetable lipid was about 50.9 wt % based on total lipid. Milk lipid was present in about 47.6 wt % of which about 44.1 wt % anhydrous milk fat. The remainder about 1.5 wt % being fish oil and single cell oil as LC-PUFA source. The amount of milk derived phospholipids was about 1.49 wt % based on total lipid. The amount of soy phospholipids was about 0.13 wt % based on total lipid. The lipid globules had a volume mode diameter of about 5.6 micrometer and the volume % of lipid globules with a mode diameter between 2 and 12 micrometer was above 45%.

The invention claimed is:

1. A powdered nutritional composition comprising protein, carbohydrates and
   (a) lipid globules with a volume weighted mode diameter of 1 micrometer or above and/or at least 45 volume % based on total lipid with a diameter of 2 to 12 micrometer; and
   (b) micronized carbohydrates (i) being smaller than 30 micrometer, and/or (ii) of which at least 80 volume % has a size less than 20 micrometer, and/or (iii) of which at least 80 volume % has a size less than 10 micrometer, and/or (iv) having a volume median particle size D50 below 10 micrometer, wherein 35-55% of the total energy content of the composition is derived from lipid, 5-12.5% of the total energy content of the composition is derived from protein, and 40-55% of the total energy content of the composition is derived from carbohydrates comprising digestible carbohydrates, wherein at least 35 wt % of the digestible carbohydrate is lactose.

2. The powdered nutritional composition according to claim 1, wherein the micronized carbohydrates comprise micronized lactose, micronized glucose, micronized maltodextrin, micronized starch, micronized inulin, micronized sucrose, or a combination thereof.

3. The powdered nutritional composition according to claim 2, wherein the micronized carbohydrates comprise micronized lactose.

4. The powdered nutritional composition according to claim 1, wherein (iii) at least 80 volume % of the micronized carbohydrates have a size less than 10 micrometer, and/or (iv) the micronized carbohydrates have a volume median particle size D50 below 10 micrometer.

5. The powdered nutritional composition according to claim 1, comprising 1-30 wt %, based on total weight of the composition, of the micronized carbohydrates.

6. The powdered nutritional composition according to claim 5, comprising 2-20 wt %, based on total weight of the composition, of the micronized carbohydrates.

7. The powdered nutritional composition according to claim 6, comprising 2-10 wt %, based on total weight of the composition, of the micronized carbohydrates.

8. The powdered nutritional composition according to claim 1, having a Flodex flowability index of at least 30.

9. The powdered nutritional composition according to claim 8, having a Flodex flowability index of at least 45.

10. The powdered nutritional composition according to claim 1, being an infant formula, a follow on formula, and/or a growing up formula.

11. The powdered nutritional composition according to claim 1, wherein the composition comprises 10 to 50 wt % lipid based on the weight of the nutritional composition.

12. The powdered nutritional composition according to claim 1, comprising at least 0.5 wt % phospholipids based on total lipid; and/or comprising protein derived from bovine milk.

13. The powdered nutritional composition according to claim 1, wherein the lipid globules have a volume-weighted mode diameter between 2.0 and 10 micrometer.

14. The powdered nutritional composition according to claim 13, wherein the lipid globules have a volume-weighted mode diameter between 4.0 micrometer and 8.0 micrometer.

15. The powdered nutritional composition according to claim 11, wherein at least 45 volume % of the lipid globules has a diameter between 2 and 12 micrometer.

16. A method for manufacturing a powdered nutritional composition, comprising (a) obtaining a spray-dried powder comprising proteins, lipids and carbohydrates, vitamins and micronutrients, and having lipid globules with a volume weighted mode diameter of 1 micrometer or above and/or at least 45 volume % based on total lipid have a diameter of 2 to 12 micrometer,
(b) blending the powder with micronized carbohydrates
  (i) smaller than 30 micrometer, and/or
  (ii) at least 80 volume % of which has a size less than 20 micrometer, and/or
  (iii) at least 80 volume % of which has a size less than 10 micrometer, and/or
  (iv) having a volume median particle size D50 below 10 micrometer.

17. The method according to claim 16, wherein the micronized carbohydrates comprise micronized lactose, micronized glucose, micronized maltodextrin, micronized starch, micronized inulin, micronized sucrose, or a combination thereof.

18. The method according to claim 17, wherein the micronized carbohydrates are (iii) at least 80 volume % of which has a size less than 10 micrometer, and/or have (iv) a volume median particle size D50 below 10 micrometer.

19. A method for providing nutrition to a subject in need thereof, the method comprising:
(a) reconstituting powdered nutritional composition comprising protein, carbohydrates and
  (i) lipid globules with a volume weighted mode diameter of 1 micrometer or above and/or at least 45 volume % based on total lipid with a diameter of 2 to 12 micrometer; and
  (ii) micronized carbohydrates (A) being smaller than 30 micrometer, and/or (B) of which at least 80 volume % has a size less than 20 micrometer, and/or (C) of which at least 80 volume % has a size less than 10 micrometer, and/or (D) having a volume median particle size D50 below 10 micrometer,
  wherein 35-55% of the total energy content of the composition is derived from lipid 5-12.5% of the total energy content of the composition is derived from protein, and 40-55% of the total energy content of the composition is derived from carbohydrates comprising digestible carbohydrates, wherein at least 35 wt % of the digestible carbohydrate is lactose, and
(b) administering the reconstituted composition to the subject.

20. The method according to claim 19, wherein the subject is a human child below 3 years of age.

21. The method according to claim 19, wherein the micronized carbohydrates are present in an amount of 0.5-30 wt %.

22. The method according to claim 19, wherein the reconstituted composition has a caloric densities between 0.1 and 2.5 kcal/ml.

23. The method according to claim 19, wherein the reconstituted composition has a viscosity between 1 and 100 mPa·s at a shear rate of 95 $s^{-1}$ at 20° C.

24. A method for providing nutrition to a subject in need thereof, the method comprising:
(a) reconstituting powdered nutritional composition comprising:
  (i) protein,
  (ii) lipid globules with a volume weighted mode diameter of 1 micrometer or above and/or at least 45 volume % based on total lipid with a diameter of 2 to 12 micrometer;
  (iii) digestible carbohydrates, wherein at least 35 wt % of the digestible carbohydrates is lactose;
  (iv) micronized carbohydrates (A) being smaller than 30 micrometer, and/or (B) of which at least 80 volume % has a size less than 20 micrometer, and/or (C) of which at least 80 volume % has a size less than 10 micrometer, and/or (D) having a volume median particle size D50 below 10 micrometer, and
(b) administering the reconstituted composition to the subject.

25. A method for providing nutrition to a subject in need thereof, the method comprising:
(a) reconstituting powdered nutritional composition comprising:
  (i) protein,
  (ii) lipid globules with a volume weighted mode diameter of 1 micrometer or above and/or at least 45 volume % based on total lipid with a diameter of 2 to 12 micrometer;
  (iii) fat, comprising at least 0.5 wt % LCPUFAs with 20-22 C atoms, with at least 80 wt % being the combination of EPA and DHA;
  (iv) micronized carbohydrates (A) being smaller than 30 micrometer, and/or (B) of which at least 80 volume % has a size less than 20 micrometer, and/or (C) of which at least 80 volume % has a size less than 10 micrometer, and/or (D) having a volume median particle size D50 below 10 micrometer, and
(b) administering the reconstituted composition to the subject.

* * * * *